United States Patent [19]

Okano et al.

[11] Patent Number: 4,724,708
[45] Date of Patent: Feb. 16, 1988

[54] METHOD FOR BALANCING A PROPELLER SHAFT

[75] Inventors: Nobuhiko Okano; Kiyoshi Taniyama; Masaru Takeda, all of Toyota, Japan

[73] Assignee: Toyota Jidosha Kabushiki Kaisha, Aichi, Japan

[21] Appl. No.: 889,612

[22] Filed: Jul. 28, 1986

[30] Foreign Application Priority Data

Aug. 2, 1985 [JP] Japan .............................. 60-171391

[51] Int. Cl.⁴ .............................................. G01M 1/24
[52] U.S. Cl. .................................... 73/460; 464/180
[58] Field of Search ................. 73/460, 462, 473, 475, 73/476, 477, 478, 479; 464/146, 906, 180

[56] References Cited

U.S. PATENT DOCUMENTS 3,758,098 9/1973 Vrilakas .............................. 269/55

FOREIGN PATENT DOCUMENTS

5938133 6/1984 Japan .

Primary Examiner—John Chapman
Attorney, Agent, or Firm—Parkhurst & Oliff

[57] ABSTRACT

This method is for balancing a propeller shaft which includes a slide type constant velocity joint which has an internal cavity for receiving lubricant. In the specified order: first, the slide type constant velocity joint is slid in to substantially the maximum amount possible therefor, so as to reduce its internal cavity to substantially its minimum volume; second, lubricant is packed into this internal cavity to a fill ratio of substantially 100%, while the constant velocity joint remains thus substantially fully slid in; and, third, while the constant velocity joint still remains thus substantially fully slid in, the propeller shaft is balanced. Thereby, unbalance of the propeller shaft due to the lubricant such as grease received in the internal cavity of the constant velocity joint becoming collected preferentially on one side of the internal cavity during the balancing process is positively prevented. Optionally, during the packing process and/or the balancing process the slide type constant velocity joint may be held by a clamp in its maximum slid in state.

1 Claim, 5 Drawing Figures

METHOD FOR BALANCING A PROPELLER SHAFT

BACKGROUND OF THE INVENTION

The present invention relates to a method for balancing a propeller shaft of the type which includes a slide type constant velocity joint, and more particularly relates to such a method for balancing such a propeller shaft including such a slide type constant velocity joint which is particularly applicable in the case that the slide type constant velocity joint has an internal cavity the volume of which is expanded and contracted as said slide type constant velocity joint slides in and out, said internal cavity being packed with grease.

A three part propeller shaft has been disclosed which has affinities with the propeller shaft disclosed in the present patent application as suitable for the application of the method of the present invention. Also in Japanese Laid-Open Publication Serial No. 59-38133 (1984), which it is not intended to admit as prior art to the present patent application except to the extent otherwise required by applicable law, three joint type propeller shafts are proposed of which the second and the third joints are fixed type constant velocity joints.

In order to reduce noise due to propeller shaft vibration, some passenger cars at the present time have come to be fitted with propeller shaft assemblies of a type incorporating at least one constant velocity joint of a slidable type instead of a Hooke joint, said slide type constant velocity joint acting as a rotational force transmitting means for coupling together two contiguous segments of the propeller shaft assembly. Such a slide type constant velocity joint usually has inside it a cavity the volume of which is expanded and contracted as said slide type constant velocity joint slides in and out, said internal cavity being packed with grease so as to provide good lubrication for the joint. The amount of grease typically packed into such an internal cavity is such that, when the slide type constant velocity joint is positioned to its so called neutral position in which it is pulled out to halfway between its fully slid in state and its fully slid out state, the cavity is filled to a prescribed packing ratio with grease, said packing ratio being substantially less than 100%.

The balancing of such a propeller shaft incorporating such a slide type constant velocity joint, however, has up till now presented certain problems. Typically, such a propeller shaft has been balanced by first positioning the constant velocity joint, as described above, to its so called neutral position in which it is pulled out to halfway between its fully slid in state and its fully slid out state, by then filling said cavity to the aforesaid prescribed packing ratio less than 100% with grease, by then mounting the propeller shaft either to a balancing machine or the actual vehicle on which it is to be used, with said constant velocity joint still in its so called neutral position, and by finally spinning said propeller shaft at high speed to determine its unbalance parameters so as to appropriately determine balance weights to be fitted thereto. Thus, in the prior art, such a propeller shaft incorporating such a slide type constant velocity joint has been balanced in a similar way to the way in which a conventional type of propeller shaft incorporating only Hooke joints has been balanced for a long time into the past.

A problem however with such a method for balancing such a propeller shaft incorporating such a slide type constant velocity joint is that during the process of spinning the shaft to balance it the grease received in the cavity of the constant velocity joint tends to become radially polarized, i.e. tends preferentially to accumulate at one position on the internal circumference of the cavity of the constant velocity joint. This is due to the fact that a considerable amount of air is present in said cavity as well as the grease, due to the fact that the aforementioned fill ratio is substantially less than 100%, and accordingly the grease is able to shift about towards one side of the cavity. This radial polarization of the grease means that an unpredictable unbalance effect due to the grease itself is engendered, and this in practice makes it impossible to balance the propeller shaft properly due to the unpredictable values of imbalance amount and imbalance phase produced by the off center grease accumulation or accumulations. This can cause undue propeller shaft vibration and noise. The problem of non uniform distribution of the grease is even further accentuated due to the fact that it is difficult for the grease to flow uniformly around in the cavity of the constant velocity joint, due to the high viscosity typical of such grease and due to the typically complex configuration of the interior parts of such constant velocity joints.

SUMMARY OF THE INVENTION

As an expedient to deal with this problem, it might be conceived of to set the constant velocity joint to its so called neutral position, as described above, in which it is pulled out to halfway between its fully slid in state and its fully slid out state (typically with the propeller shaft mounted to the body of its vehicle), and then to fill its said cavity with grease to a packing ratio equal to either 0% or to 100%. Either of these concepts would indeed simplistically resolve the problem of off-center grease accumulation disturbing the balancing process, but the former of them, in which substantially no grease was filled into the constant velocity joint, would engender problems related to the durability of the constant velocity joint, while the latter of these concepts would pose problems related to the slide resistance presented by the constant velocity joint during axial compression thereof, and to ejection of grease from any air hole thereof. Accordingly, from the practical point of view, neither of such concepts is any help for resolving the above outlined problem.

Accordingly, it is the primary object of the present invention to provide a method for balancing a propeller shaft incorporating such a slide type constant velocity joint, which is free from the problems outlined above.

It is a further object of the present invention to provide such a method for balancing such a propeller shaft, which can avoid any balance problems connected with off center heaping up of the grease contained in the cavity of the slide type constant velocity joint.

It is a further object of the present invention to provide such a method for balancing such a propeller shaft, which does not run into any problems connected with the lubrication of the slide type constant velocity joint.

It is a yet further object of the present invention to provide such a method for balancing such a propeller shaft, which does not run into any problems connected with the sliding resistance presented by the slide type constant velocity joint.

It is a yet further object of the present invention to provide such a method for balancing such a propeller shaft, which provides a propeller shaft which can function well without undue vibration and noise.

According to the most general aspect of the present invention, these and other objects are attained by a method for balancing a propeller shaft which comprises a slide type constant velocity joint which has an internal cavity for receiving lubricant, wherein, in the specified order: (a) said slide type constant velocity joint is slid in to substantially the maximum amount possible therefor, thus to reduce said internal cavity thereof to substantially its minimum volume; (b) lubricant is packed into said internal cavity of said slide type constant velocity joint to a fill ratio of substantially 100%, while said slide type constant velocity joint remains thus slid in to substantially the maximum amount possible therefor; and (c) while said slide type constant velocity joint still remains thus slid in to substantially the maximum amount possible therefor, said propeller shaft is balanced. Optionally, during step (b) and/or during step (c), said slide type constant velocity joint is held by a clamp in its said state as thus slid in to substantially the maximum amount possible therefor.

In the practice of this propeller shaft balancing method, since the internal cavity of the slide type constant velocity joint is packed to a fill ratio of substantially 100% while said slide type constant velocity joint remains slid in to substantially the maximum amount possible therefor, and subsequently the propeller shaft is balanced while the slide type constant velocity joint is kept in this condition, thereby, since air is virtually not present at all in said constant velocity joint internal cavity, it is virtually impossible for the grease in said internal cavity to become displaced into an off center heap during the balancing process. Thus, the occurrence of grease polarization is virtually prevented, and good propeller shaft balancing is always available.

BRIEF DESCRIPTION OF THE DRAWINGS

The present invention will now be described with respect to the preferred embodiment thereof, and with reference to the illustrative drawings appended hereto, which however are provided for the purposes of explanation and exemplification only, and are not intended to be limitative of the scope of the present invention in any way, since this scope is to be delimited solely by the accompanying claims. With relation to the figures, spatial terms are to be understood as referring only to the orientation on the drawing paper of the illustrations of the relevant parts, unless otherwise specified; like reference numerals, unless otherwise so specified, denote the same parts and gaps and spaces and so on in the various figures.

FIG. 1 is a longitudinal cross sectional view showing the principal parts of a slide type constant velocity joint which is for being incorporated in a three part propeller shaft assembly which is to be balanced according to the preferred embodiment of the propeller shaft balancing method of the present invention, and in its upper portion shows said slide type constant velocity joint as substantially empty of lubricating grease and in its state of being pulled out approximately halfway so that its internal volume is approximately halfway between its maximum and minimum extremes, while in its lower portion it shows said slide type constant velocity joint as packed substantially full of a quantity of lubricating grease and in its state of being pushed in to the maximum so that its internal volume is minimized;

DESCRIPTION OF THE PREFERRED EMBODIMENT

Figure 5:
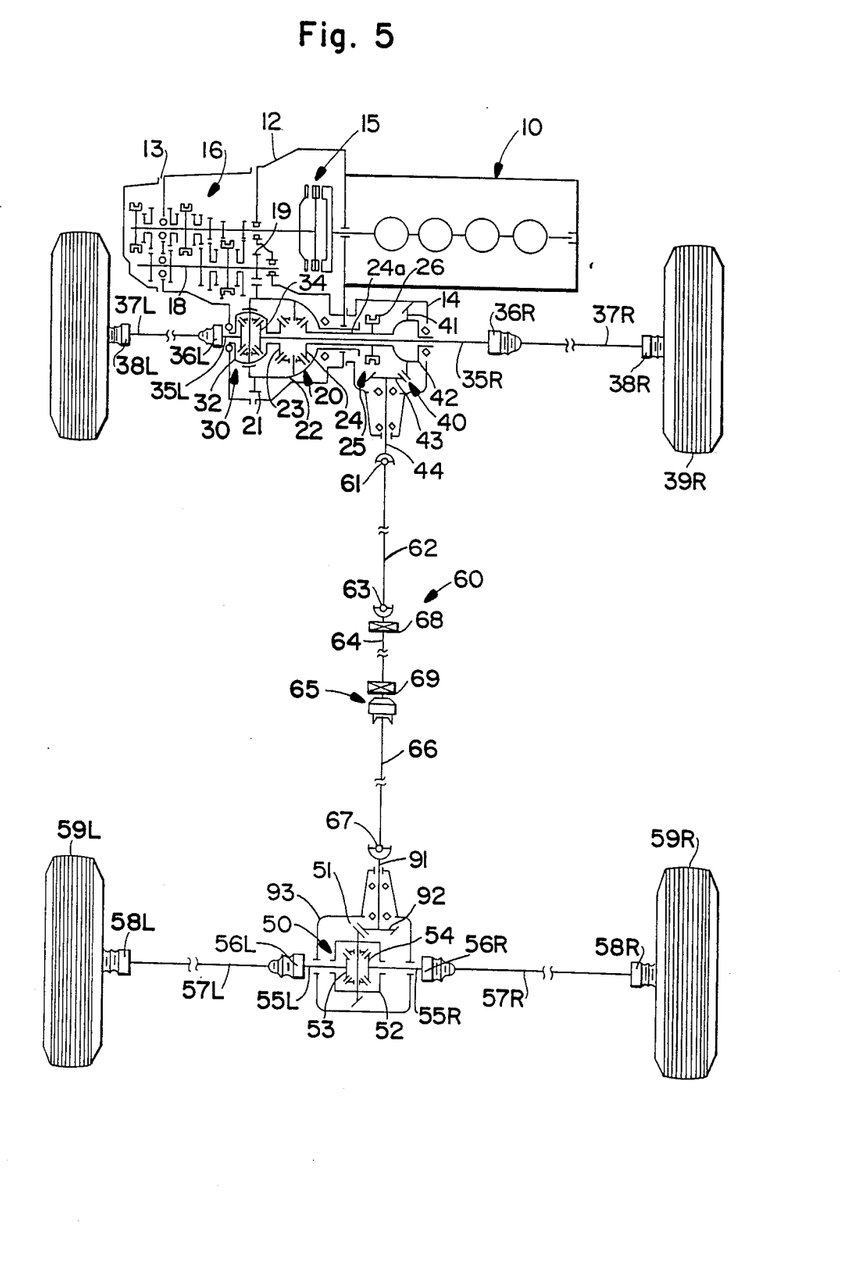
FIG. 5 is a schematic skeleton plan view showing a power train of an automotive vehicle incorporating said three part propeller shaft assembly with said slide type constant velocity joint, and further showing constructional details of other power transmission devices incorporated in said power train.

The present invention will now be described with reference to the preferred embodiment thereof, and with reference to the figures. First, an explanation will be made, with reference to FIG. 5, of the application of a three part propeller shaft assembly of the type which the present invention seeks to balance. FIG. 5 shows in schematic skeleton plan view a power train of a four wheel drive type automotive vehicle incorporating such a three part propeller shaft assembly; this automotive vehicle in fact is of the so called full time 4WD type, and has an engine transversely mounted in its engine room. In this figure, the reference numeral 10 denotes said transversely mounted engine, while 15 denotes a clutch device driven from said engine 10, 16 denotes a transmission mechanism including a gear transmission mechanism which can be set to any one of a plurality of speed stages, 20 denotes a central differential device, 30 denotes a front wheel differential device, 40 denotes a rear wheel drive direction altering mechanism, 60 denotes the aforesaid three part propeller shaft assembly, and 50 denotes a rear wheel differential device, which is mounted inside a casing 93.

In more detail, the engine 10 is as abovementioned transversely mounted in the engine room, not particularly shown, of the vehicle, with the crank shaft 11 of said engine 10 extending transversely to the longitudinal axis of the vehicle. To one end of the engine block of the engine 10 there is fixed a transaxle and clutch casing, generally denoted by 12, and to the end of said transaxle casing 12 opposite from the engine 10 there is mounted a transmission housing 13. And on the engine 10 side of the transaxle and clutch casing 12, but somewhat rearwards displaced from said engine 10, there is fixed a transfer casing 14.

The crank shaft 11 is drivingly coupled to a rotational power input member of the coaxially disposed clutch device 15, and a rotational power output member of said clutch device 15 is drivingly coupled to a rotational power input member or input shaft 17 of the similarly coaxially disposed transmission device 16. A rotational power output member or output shaft 18 of said transmission device 16 is rotatably mounted in the transmission housing 13 and is disposed in parallel with said input shaft 17, and further has a power output gear wheel 19 fixedly mounted on it. The clutch device 15 and the transmission device 16 are of per se conventional types and function in per se conventional ways; accordingly, the details of their structure and functioning will not be further discussed in this specification.

In the transaxle casing 12 there are further fitted the central differential device 20 and the front wheel differential device 30. The central differential device 20 is of a per se known bevel gear type, and divides the rotational power inputted to it from the engine 10 via the clutch device 15 and the transmission device 16 between a front wheel transmission assembly and a rear wheel transmission assembly. In detail, this central differential device 20 comprises a differential case 22 rotatably mounted in the transaxle casing 12 and a final reduction gear or ring gear 21, supported on said differential case 22, which is constantly meshingly engaged with the power output gear wheel 19 of the transmission device 16. Two differential pinion gears, not denoted by any reference numerals, are rotatably mounted to said differential case 22 about an axis transverse to the axis of the final reduction ring gear 21, and with these differential pinion gears there are meshed a left side driven gear wheel 23 and a right side driven gear wheel 24; thus, differential action is available for distributing rotational power between said left and right side driven gear wheels 23 and 24. The left side driven gear wheel 23 is integrally formed on the end of a shaft the other end of which is integrally formed with a differential casing 32 of the front wheel differential device 30, while the right side driven gear wheel 24 is integrally formed on the end of a hollow shaft member 24a which extends out from the transaxle casing 12 to the interior of the transfer casing 14.

The front wheel differential device 30 is provided on one side (the left side with respect to the longitudinal axis of the vehicle, and in the figure) of the central differential device 20, and is coaxial therewith. The differential casing 32 of said front wheel differential device 30 is, as implied above, directly rotationally driven from the left side driven gear wheel 23 of said central differential device 20, and carries two differential pinion gears, not denoted by any reference numerals, which are rotatably mounted to said differential casing 32 about an axis transverse to the main longitudinal axis of said front wheel differential device 30. With these differential pinion gears there are meshed a left side driven gear wheel 33 and a right side driven gear wheel 34; thus, differential action is available for distributing rotational power between said left and right side driven gear wheels 33 and 34. The left side driven gear wheel 33 is rotationally coupled, via a relatively short left side front vehicle axle 35L, a left side slide type constant velocity joint 36L, a left side drive shaft 37L, and a left side fixed type constant velocity joint 38L, to the left front wheel 39L of the vehicle. Similarly, the right side driven gear wheel 34 is rotationally coupled, via a relatively long right side front vehicle axle 35R which extends completely through the central differential device 20 and through the rear wheel drive direction altering mechanism 40 and is in fact rotationally supported by tubular components thereof, and via a right side slide type constant velocity joint 36R, a right side drive shaft 37R, and a right side fixed type constant velocity joint 38R, to the right front wheel 39R of the vehicle. Thereby, rotational power from the engine 10 of the vehicle is transmitted, after being provided with differential action with respect to division between the front and the rear wheels of the vehicle by the central differential device 20, to said left and right front wheels 39L and 39R, with differential action being provided between said left and right front wheels 39L and 39R by this front wheel differential device 30 subsequently to the aforesaid front and rear differential action provided by said central differential device 20.

Inside the transfer casing 14 there is provided the rear wheel drive direction converting gear mechanism 40, and there is also provided a selectively actuatable locking mechanism 25 incorporating a locking sleeve 26 spline fitted over the hollow shaft member 24a extending out from the transaxle casing 12, which can either lock the right side driven gear wheel 24, which is integrally formed together with said hollow shaft member 24a, to the differential case 22 of the central differential device 20, or can allow these members to be rotationally free with respect to one another. The the rear wheel drive direction converting gear mechanism 40 comprises a mounting case 42 on the periphery of which there is provided a ring gear 41, said mounting case 42 being rotationally drivingly coupled to the end of the hollow shaft member 24a and being rotationally driven thereby. With the ring gear 41 there is constantly meshed a driven pinion gear 43 fixedly mounted on the forward end of a driven pinion gear shaft 44, and thereby the directional axis of the driving rotational force for the rear wheels of the vehicle is converted from being transverse to the vehicle body to being longitudinal to said vehicle body.

This driving rotational force for the rear wheels of the vehicle is then transmitted from the rear end of this driven pinion gear shaft 44, via the three part propeller shaft assembly herein denoted as 60 which will be described in detail shortly, to the forward end of a drive pinion gear shaft 91, on the rear end of which there is fixedly mounted a drive pinion gear 92 which is constantly meshed with a ring gear 51 which is provided on the periphery of a differential case 52 of the rear wheel differential device 50, which is accordingly rotationally driven by said ring gear 51. This differential case 52 carries two differential pinion gears, not denoted by any reference numerals, which are rotatably mounted to said differential case 52 about an axis transverse to the main longitudinal axis of said rear wheel differential device 50. With these differential pinion gears there are meshed a left side driven gear wheel 53 and a right side driven gear wheel 54; thus, differential action is available for distributing rotational power between said left and right side driven gear wheels 53 and 54. The left side driven gear wheel 53 is rotationally coupled, via a left side rear vehicle axle 55L, a left side slide type constant velocity joint 56L, a left side drive shaft 57L, and a left side fixed type constant velocity joint 58L, to the left rear wheel 59L of the vehicle. Similarly, the right side driven gear wheel 54 is rotationally coupled, via a right side rear vehicle axle 55R, a right side slide type constant velocity joint 56R, a right side drive shaft 57R, and a right side fixed type constant velocity joint 58R, to the right rear wheel 59R of the vehicle. Thereby, rotational power transmitted through the propeller shaft assembly 60 from the engine 10 of the vehicle is transmitted, after being provided with differential action with respect to division between the front and the rear wheels of the vehicle by the central differential device 20, to said left and right rear wheels 59L and 59R, with differential action thus being provided between said rear wheels 59L and 59R by this rear wheel differential device 50.

Figure 3:
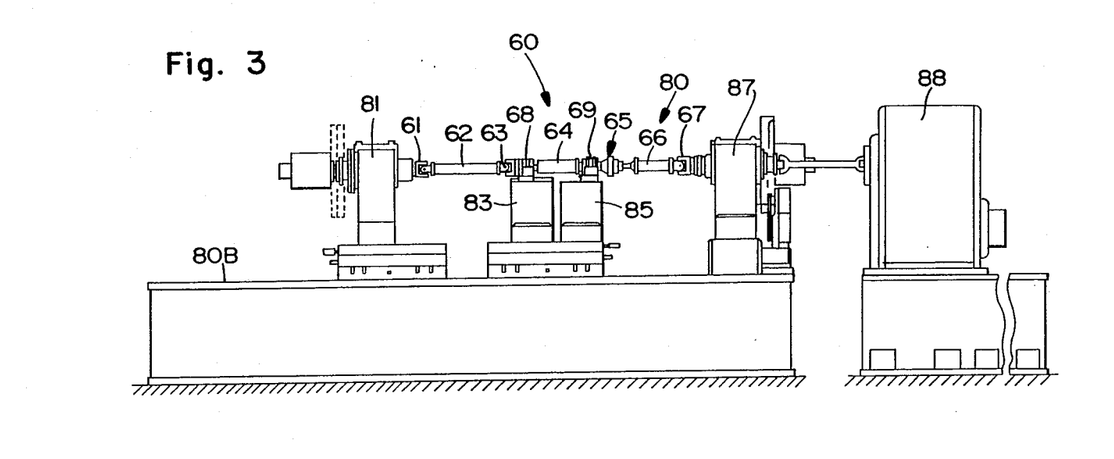
FIG. 3 shows a simplified view from the side of a propeller shaft balancing machine being used to practice the preferred embodiment of the propeller shaft balancing method of the present invention upon a three part propeller shaft assembly incorporating the slide type constant velocity joint of FIGS. 1 and 2.

Now, the three part propeller shaft assembly which is appropriate for being balanced by the preferred embodiment of the propeller shaft balancing method of the present invention, herein denoted as 60, will be described, with particular reference to FIG. 3 which shows said three part propeller shaft assembly from the side. This propeller shaft assembly 60 drivingly couples the rear end of the driven pinion gear shaft 44 to the front end of the drive pinion gear shaft 91, and comprises, in order from the front to the rear of the vehicle: a first joint 61 which is a Hooke joint, a front propeller shaft element 62, a second joint 63 which is also a Hooke joint, a center propeller shaft element 64, a third joint 65 which is a slidable constant velocity joint of a type which will be described shortly, a rear propeller shaft element 66, and a fourth joint 67 which is also a Hooke joint. The three part propeller shaft assembly 60 of the present invention also comprises supports 68 and 69 which are provided near the front and rear ends of the center propeller shaft element 64 and elastically support said center propeller shaft element 64 from the floor of the vehicle body with a certain degree of resilience, while allowing said center propeller shaft element 64 to be free to rotate about its central axis. The first Hooke joint 61 rotationally couples the front end of the front propeller shaft element 62 to the rear end of the driven pinion gear shaft 44, while allowing a certain angular inclination to be present between their central longitudinal axes. The second Hooke joint 63 rotationally couples the front end of the central propeller shaft element 64 to the rear end of the front propeller shaft element 62, while allowing a certain other angular inclination to be present between their central longitudinal axes. The third slidable constant velocity joint 65 rotationally couples the front end of the rear propeller shaft element 66 to the rear end of the central propeller shaft element 64, while allowing yet another certain angular inclination to be present between their central longitudinal axes. And the fourth Hooke joint 67 rotationally couples the front end of the drive pinion gear shaft 91 to the rear end of the rear propeller shaft element 66, while allowing yet another certain angular inclination to be present between their central longitudinal axes. The supports 68 and 69 serve for supporting the central propeller shaft element 64 and for stopping the whole construction from flopping about and thrashing around, i.e. from having too many degrees of freedom, albeit with a certain amount of resilience.

Figure 1:
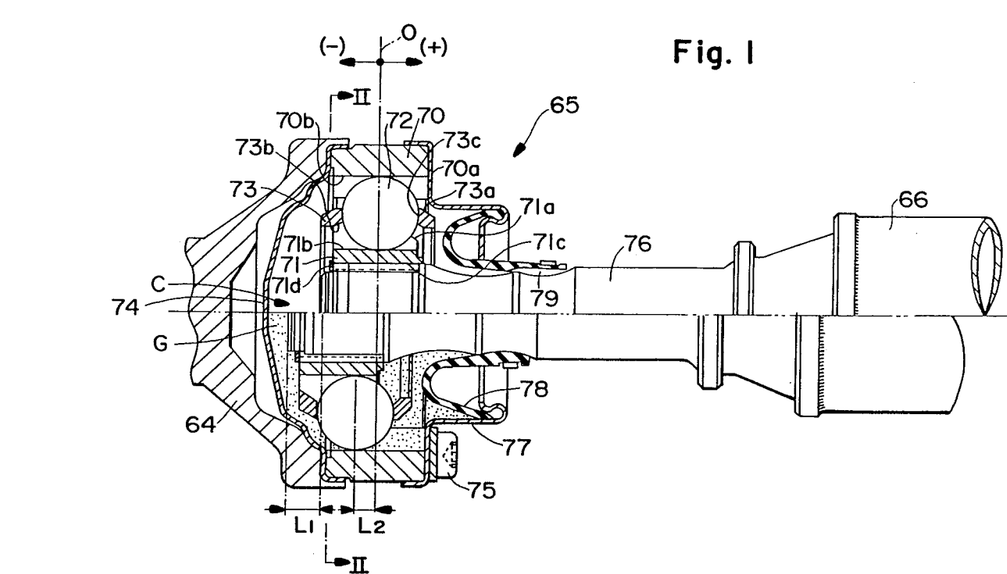

The third joint 65 is a slide type constant velocity joint as mentioned above, while Hooke joints are utilized for the first, the second, and the fourth joints 61, 63, and 67. This slide type constant velocity joint 65 is particularly shown in longitudinal cross sectional view in FIG. 1 and in transverse cross sectional view in FIG. 2; said slide type constant velocity joint 65 is a so called Cross Groove Universal joint or VL (V type loose) joint, which has superior constant velocity characteristics. The upper portion of FIG. 1 shows said slide type constant velocity joint 65 in its state of being pulled out approximately halfway so that its internal volume is approximately halfway between its maximum and minimum extremes; and the lower portion of FIG. 1 shows said slide type constant velocity joint 65 in its state of being pushed in to the maximum, so that its internal volume is minimized. Further, FIG. 2, like the upper part of FIG. 1, shows said slide type constant velocity joint 65 in its state of being pulled out approximately halfway so that its internal volume is approximately halfway between its maximum and minimum extremes.

Figure 2:
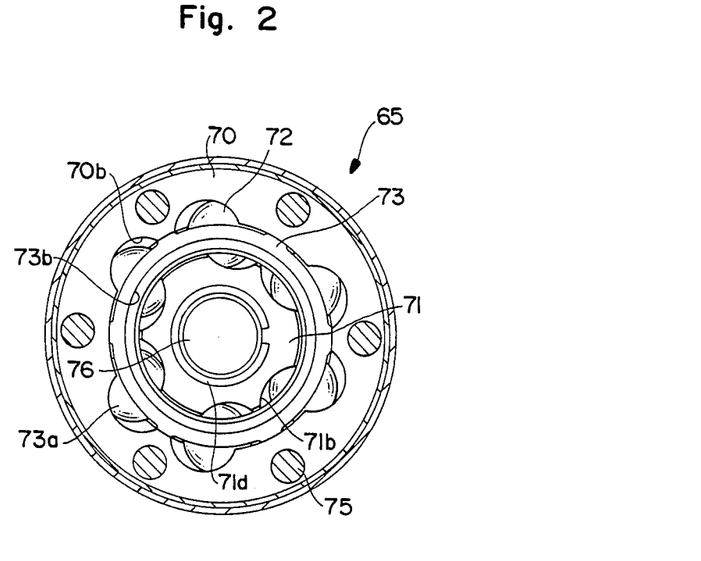
FIG. 2 is a transverse cross sectional view of said slide type constant velocity joint of FIG. 1, taken in a plane shown by the arrows II—II in FIG. 1 and showing said slide type constant velocity joint in its state of being pulled out approximately halfway so that its internal volume is approximately halfway between its maximum and minimum extremes.

As is per se known, this Cross Groove Universal joint 65 comprises an outer race 70, an inner race 71, a plurality of torque transmission balls 72, and a cage 73. In more detail, the outer race 70 is formed with a cylindrical inner circumferential surface 70a in which six (in this embodiment) generally spiral shaped ball channels 70b are formed. The inner race 71 is formed with a part spherical outer circumferential surface 71a on which six generally spiral shaped ball channels 71b are formed in positions generally corresponding to the ball channels 70b formed in the cylindrical inner circumferential surface 70a of the outer race 70. These ball channels 70b and 71b are formed as pairs on the opposing cylindrical and spherical surfaces 70a and 71a in such a manner as to skew incline at equal skew angles in opposite directions. And the six torque transmission balls 72 are rollably fitted between the outer race 70 and the inner race 71, each rolling within one of the ball channels 70b of said outer race 70 and within an opposing one of the ball channels 71b of said inner race 71. Further, the cage 73 is formed in the shape of a central frustum of a hollow sphere, having an outer spherical frustum surface 73a and an inner spherical frustum surface 73b, and is received inside the cylindrical inner circumferential surface 70a of the outer race 70 with its said outer spherical frustum surface 73a touching or nearly touching said cylindrical inner circumferential surface 70a of said outer race 70, and with its said inner spherical frustum surface 73b lying outside and confronting the part spherical outer circumferential surface 71a of the inner race 71 with a certain gap being left therebetween to allow free mutual relative motion. Six apertures 73c are formed through the cage 73 from its outer spherical frustum surface 73a to its inner spherical frustum surface 73b at equal intervals therearound, and receive the six torque transmission balls 72 and hold them in the ball channels 70b of the outer race 70 and the ball channels 71b of the inner race 71 while allowing said balls 72 to move in said channels 70b and 71b. And the center of the inner and outer spherical frustum surfaces of the cage 73 always is substantially coincident with the center of the spherical surface of the inner race 71, and each of the torque transmission balls 72 is always held by said cage 73 with its outer surface portion rolling in its one of the ball channels 70b of the outer race 70, with its inner surface portion rolling in its one of the ball channels 71b of said inner race 71, and with its center always approximately lying on the plane transverse to the central axis of symmetry of said cage 73 and axially midway therealong.

The outer race 70 is secured at the rear end of the center propeller shaft element 64 by a retainer 74 and by bolts 75 only one of which can be seen in FIG. 1, and the inner race 71 is secured securely and integrally to a stub shaft 76 by means of splines 71c formed on a cylindrical inner surface of said inner race 71, and by means of a snap ring 71d. The stub shaft 76 is secured integrally by welding to the front end of the rear propeller shaft element 66. And a boot 78 is furnished between the stub shaft 76 and a cover 77 press fitted to the outer circumference of the outer race 70; the reference numeral 79 denotes an air hole. The space or interior cavity C within this constant velocity Cross Type Universal joint 65 is partly or wholly (depending upon the slide position of said joint 65 as will be descanted upon in detail shortly) filled with lubricating grease, denoted in the lower part of FIG. 1 by the reference symbol G.

According to the per se known operation of this constant velocity slide type Cross Type Universal joint 65, the center propeller shaft element 64 and the rear propeller shaft element 66 are drivingly rotationally coupled together in a constant velocity type manner, even when a certain non zero inclination angle is present between their longitudinal axes, and at the same time a certain desirable amount of relative axial sliding is allowed between said center propeller shaft element 64 and said rear propeller shaft element 66. A typical value which will be exemplarily assumed henceforward in this specification for this allowed slide amount, as reckoned from the central sliding adjustment position of the slide type constant velocity joint 65, is approximately ±13 mm, where "+" refers to sliding out of the joint 65 and "−" refers to sliding in thereof. However, since when the constant velocity joint 65 is slid in to the aforesaid maximum amount of 13 mm a direct metallic contact is engendered between the inner race 71 and the cage 73, which is not desirable from the point of view of smooth operation without damage to the parts, the practical maximum amount of slide in this exemplary case is in practice taken as being approximately 12.5 mm, as indicated by the distance $L_1$ in FIG. 1. At this time the displacement of the plane defined by the centers of the six torque transmission balls 72 from the axially central plane (denoted by "O") of the outer and inner races 70 and 71 of the joint 65 (in which axially central plane said centers of said balls 72 lie when the joint 65 is in its halfway pulled out condition) is about 6.25 mm, as indicated by the distance $L_2$ in FIG. 1. A typical value which will be exemplarily assumed henceforward in this specification for the volume of the space or interior cavity C defined internally of the slide type constant velocity joint 65, when said slide type constant velocity joint 65 is in its state of being pulled out approximately halfway, is approximately 140 $cm^3$. This interior cavity C within the slide type constant velocity joint 65 increases in volume as the joint 65 is pulled out and decreases in volume as said joint 65 is pushed in; and the minimum volume of said internal space C in practice, when as described above said slide type constant velocity joint 65 is pushed in by the practically maximum amount of 12.5 mm, will hereinafter be taken as exemplarily about 113 $cm^3$.

Now, the propeller shaft balancing method according to the preferred embodiment of the present invention will be described, with particular reference to FIG. 3, which shows a simplified view from the side of a propeller shaft balancing machine, generally denoted by the reference numeral 80, which is being used to practice said preferred embodiment propeller shaft balancing method upon the three part propeller shaft assembly 60 just described. This propeller shaft balancing machine 80 comprises a main base 80B upon which are elastically supported a first joint unbalance detecting apparatus 81, a second joint unbalance detecting apparatus 83, a third joint unbalance detecting apparatus 85, and a fourth joint unbalance detecting apparatus 87. The three part propeller shaft assembly 60 is mounted through these first, second, third, and fourth unbalance detecting apparatuses 81, 83, 85, and 87, which respectively are positioned relatively close to the first Hooke joint 61, the second Hooke joint 63, the third slide type constant velocity joint 65, and the fourth Hooke joint 67; in fact, in the shown example, the second and the third joint unbalance detecting apparatuses 83 and 85 are mounted to the supports 68 and 69 respectively. The propeller shaft balancing machine 80 further comprises a drive apparatus 88 which rotationally powers the three part propeller shaft assembly 60 to spin at a determinate and considerable rotational speed in the mounted position thereof.

Figure 4:
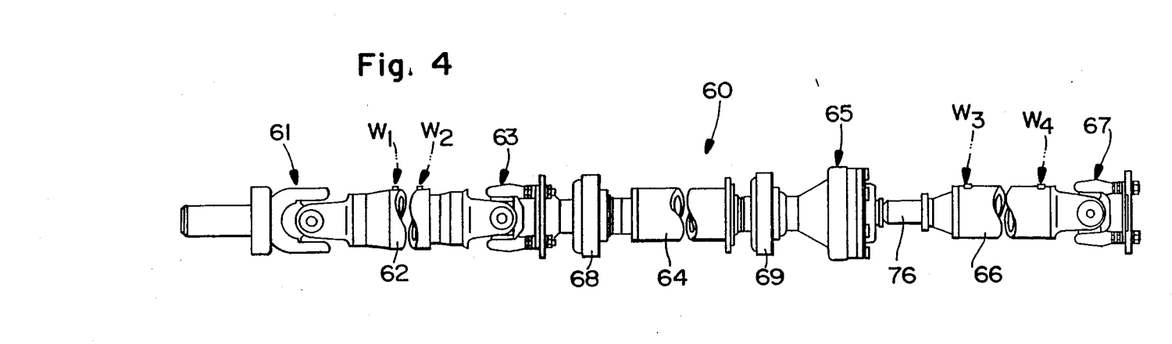
FIG. 4 is an external side view of said three part propeller shaft assembly incorporating said slide type constant velocity joint, as seen in isolation, along with balancing weights W1 through W4 mounted thereon.

Particularly according to the inventive concept of the present invention, before the three part propeller shaft assembly 60 is thus mounted to the propeller shaft balancing machine 80, the third slide type constant velocity joint 65 thereof is slid in to the aforesaid practically maximum amount of about 12.5 mm, and then said third slide type constant velocity joint 65 is filled with lubricating grease G (as per FIG. 1) to the amount of approximately 113 $cm^3$, so as in these circumstances to achieve a fill ratio of the interior cavity C thereto to approximately 100%. And then said three part propeller shaft assembly 60 is thus mounted to the propeller shaft balancing machine 80, with said third slide type constant velocity joint 65 thereof still being maintained as slid in to the aforesaid practically maximum amount of about 12.5 mm, and then the drive apparatus 88 is operated to rotationally spin said three part propeller shaft assembly 60 at said determinate and considerable rotational speed. The unbalanced accelerations or wobblings which appear at or near the first through the fourth joints 61, 63, 65, and 67 of said three part propeller shaft assembly 60 are detected by the respective first through the fourth joint unbalance detecting apparatuses 81, 83, 85, and 87, and simultaneously the phases of said unbalanced wobblings are detected by a pulse gear (not particularly shown), and then these unbalanced wobblings are corrected by the machine operator attaching appropriate balance weights to said three part propeller shaft assembly 60. In more detail, as shown in FIG. 4, the unbalanced wobbling detected by the first joint unbalance detecting apparatus 81 is corrected by the operator attaching an appropriate balance weight W1 to the front end of and at an appropriate rotational position on the front propeller shaft element 62 near the first Hooke joint 61; the unbalanced wobbling detected by the second joint unbalance detecting apparatus 83 is corrected by the operator attaching an appropriate balance weight W2 to the rear end of and at an appropriate rotational position on said front propeller shaft element 62 near the second Hooke joint 63; the unbalanced wobbling detected by the third joint unbalance detecting apparatus 85 is corrected by the operator attaching an appropriate balance weight W3 to the front end of and at an appropriate rotational position on the rear propeller shaft element 66 near the third slide type constant velocity joint 65; and the unbalanced wobbling detected by the fourth joint unbalance detecting apparatus 87 is corrected by the operator attaching an appropriate balance weight W4 to the rear end of and at an appropriate rotational position on said rear propeller shaft element 66 near the fourth Hooke joint 67.

All the while that this balancing is occurring, according to the inventive concept of the present invention, the third slide type constant velocity joint 65 is kept in its condition as slid in to the aforesaid practically maximum amount of about 12.5 mm, so that its fill ratio by the lubricating grease G is kept at approximately 100%. Desirably, in fact, there may be provided a clamp device, not particularly shown in the figures, which is clamped onto said third slide type constant velocity joint 65 so as forcibly to hold it in its said condition as slid in to the aforesaid practically maximum amount of about 12.5 mm. This is helpful during the process of filling the cavity C with the grease G, and also subsequently during transportation of the three part propeller shaft assembly 60, because it enables the prevention of seepage of air in through the air hole 79 and into the interior cavity C of the constant velocity joint 65. Of course, such a clamp device is similarly helpful during the process of balancing of the three part propeller shaft assembly 60, provided that it is not unbalanced itself and does not disturb the balancing process. In any case, when the three part propeller shaft assembly 60 is being balanced as described above, because the quantity of grease G is packed into the interior cavity C of the constant velocity joint 65 to a fill ratio of substantially 100%, virtually no air is present in said interior cavity C, and accordingly during the balancing process, although the three part propeller shaft assembly 60 and the constant velocity joint 65 are spinning at relatively high speed, substantially no problem can exist of the quantity of grease G becoming unbalanced towards one or the other side of said interior cavity C of the constant velocity joint 65, and irregular balance of the three part propeller shaft assembly 60 due to sideways polarization of said grease G is not likely to be occasioned.

Further, when the constant velocity joint 65 is pulled out to its neutral position as shown in the upper half of FIG. 1 during the fitting of the three part propeller shaft assembly 60 to a vehicle as schematically shown in FIG. 5, so that its internal volume is approximately halfway between its maximum and minimum extremes and so that air is sucked into the interior cavity C thereof, then as exemplarily defined above the grease fill ratio of said interior cavity C becomes about 80.7%, but this does not cause the quantity of grease G to become substantially unbalanced towards one or the other side of said interior cavity C of said constant velocity joint 65, because the air which is sucked into said interior cavity C is substantially uniformly distributed around the central axis of said interior cavity C. Accordingly, the good balance of the three part propeller shaft assembly 60 is not substantially disturbed at this time. As a result, the propeller shaft balancing method of the present invention is able to be utilized for balancing a propeller shaft incorporating a slide type constant velocity joint, by balancing only the metal elements of said shaft, without having to worry about the possibility of the grease received in the interior cavity of said constant velocity joint becoming unbalanced and disturbing the balancing process for said shaft. Accordingly, good balance of such a propeller shaft incorporating a slide type constant velocity joint becomes practicable, and it is possible to effectively reduce vibration noise in a vehicle equipped with such a propeller shaft incorporating a slide type constant velocity joint, as for example in the vehicle whose power train is diagrammatically shown in FIG. 5.

According to the method of the present invention as described above with respect to the preferred embodiment thereof, first the third slide type constant velocity joint 65 thereof was slid in to its particular aforesaid exemplary practically maximum amount of about 12.5 mm, and then said third slide type constant velocity joint 65 was filled with lubricating grease G to the amount of approximately 113 cm³ so as to achieve a fill ratio of the interior cavity C thereof to approximately 100%; only subsequently was said three part propeller shaft assembly 60 mounted to the propeller shaft balancing machine 80 in the condition to be balanced. It might be wondered if the same result might be achieved by first positioning said third slide type constant velocity joint 65 to its neutral position as shown in the upper half of FIG. 1 so that its internal volume was approximately halfway between its maximum and minimum extremes, by then filling about 113 cm³ of grease G inot said interior cavity C so that the grease fill ratio of said interior cavity C would become about 80.7%, and by finally sliding in said third slide type constant velocity joint 65 to its practically maximum amount of about 12.5 mm so as to bring the fill ratio of the interior cavity C thereof to approximately 100%, before mounting the three part propeller shaft assembly 60 to the propeller shaft balancing machine 80 and balancing it. However, this alternative procedure would not at all achieve the same results as the method of the present invention, because when the sliding in action of the third slide type constant velocity joint 65 was performed all of the air in the internal cavity C thereof would not be perfectly exhausted through the hole 79, and some air would inevitably remain in the deep inner reachis of said internal cavity C, especially on the side thereof towards the retainer 74. Hence, sideways polarization of the quantity of grease G would inevitably occur during the balancing process, thereby quite upsetting the good balancing of the three part propeller shaft assembly 60 as a whole. Thus, it is seen that only by the method of the present invention can the good results made available thereby be satisfactorily secured.

Although the present invention has been shown and described in terms of the preferred embodiment thereof, and with reference to the appended drawings, it should not be considered as being particularly limited thereby, since the details of any particular embodiment, or of the drawings, could be varied without, in many cases, departing from the ambit of the present invention. For example, although in the above disclosed preferred embodiment the propeller shaft was of the three element type which incorporated foru joints of which one was a slide type constant velocity joint, in other embodiments it would be possible for the propeller shaft to be of the two element type which incorporates three joints of which one is a slide type constant velocity joint. Further, the slide type constant velocity joint, rather than being a Cross Groove Universal joint or VL (V type loose) joint, could be a tripod type universal joint or a double offset type universal joint. Accordingly, the scope of the present invention is to be considered as being delimited, not by any particular perhaps entirely fortuitous details of the disclosed preferred embodiment, or of the drawings, but solely by the scope of the accompanying claims, which follows.

What is claimed is:

1. A method for balancing a propeller shaft which comprises a slide type constant velocity joint which has an internal cavity for receiving lubricant, wherein, in the specified order:
   (a) said slide type constant velocity joint is slid in to substantially the maximum amount possible therefor, thus to reduce said internal cavity thereof to substantially its minimum volume;
   (b) lubricant is packed into said internal cavity of said slide type constant velocity joint to a fill ratio of substantially 100%, while said slide type constant velocity joint remains thus slid in to substantially the maximum amount possible therefor; and
   (c) while said slide type constant velocity joint still remains thus slid in to substantially the maximum amount possible therefor, said propeller shaft is balanced.

* * * * *